Dec. 20, 1960     B. F. STEWARD ET AL     2,964,844

CAKE-LAYER CUTTERS

Filed Dec. 19, 1958

*INVENTORS:*
BENJAMIN F. STEWARD
&
*BY* MARIE C. STEWARD

Alfred W Petchaft
ATTORNEY

United States Patent Office 2,964,844
Patented Dec. 20, 1960

2,964,844

CAKE-LAYER CUTTERS

Benjamin F. Steward, 7365 Flora Ave., Maplewood, Mo., and Marie C. Steward, 152 N. Brentwood Blvd., Clayton, Mo.

Filed Dec. 19, 1958, Ser. No. 781,692

3 Claims. (Cl. 30—116)

This invention relates in general to certain new and useful improvements in culinary equipment, and, more particularly, to a cake-layer cutter.

It is a popular practice both in homes and in commercial baking institutions to bake so-called split layer cakes in which the several layers are relatively thin and may be of different flavors with different fillings between such layers. The cake pans used to bake the several layers are manufactured in standard sizes or height, the smallest being one inch, but layers of this or greater thickness are not satisfactory for many types of layer cakes. As a result, the housewife or baker bakes the several layers individually in the cake pans and when the layers are properly baked and cooled, they are removed from the cake pans and placed on trays. The several layers are then each longitudinally split to provide twice the number of layers, each being one-half the height of the original layers, whereupon the layers are superimposed on each other and the cake is frosted in the usual manner.

The usual procedure for cutting the layers consists of inserting a plurality of toothpicks into the layer at points around the side wall thereof so that the toothpicks project horizontally from the side wall and form a series of markers defining the plane along which the layer is to be cut. The baker or housewife then grasps a string with both hands and holds the string or thread tautly, whereupon the string is pulled through the layer along the plane marked by the toothpicks to cut the layer into two parts. It has been found, however, that this procedure is both time consuming and difficult to execute even by persons relatively skilled in this technique, and, as a result, the layers are often unevenly cut or otherwise damaged to such extent that they cannot be incorporated into the cake. Consequently, in commercial baking institutions the cost of producing such cakes is relatively high. Furthermore, many housewives do not attempt to bake such cakes solely because of the difficulties involved in slitting the layers.

It is, therefore, a primary object of the present invention to provide a cake-layer cutter which quickly and easily slits a cake layer lengthwise thereof so as to form two layers each of smaller height than the original layer.

It is also an object of the present invention to provide a cutter of the type stated which is reliable in operation and thereby reduces the amount of waste attendant with the making of split-layer cakes.

It is another object of the present invention to provide a cutter of the type stated which is capable of lengthwise cutting cake layers of various sizes and shapes.

It is a further object of the present invention to provide a cutter of the type stated which is inexpensive to construct and requires no special skill in the use thereof.

With the above and other objects in view, our invention resides in the novel features of form, construction, arrangement, and combination of parts presently described and pointed out in the claims.

In the accompanying drawing:

Fig. 1 is a front elevational view of a cake-layer cutter constructed in accordance with and embodying the present invention;

Figs. 2 and 3 are fragmentary sectional views taken along lines 2—2 and 3—3, respectively, of Fig. 1;

Figure 1:
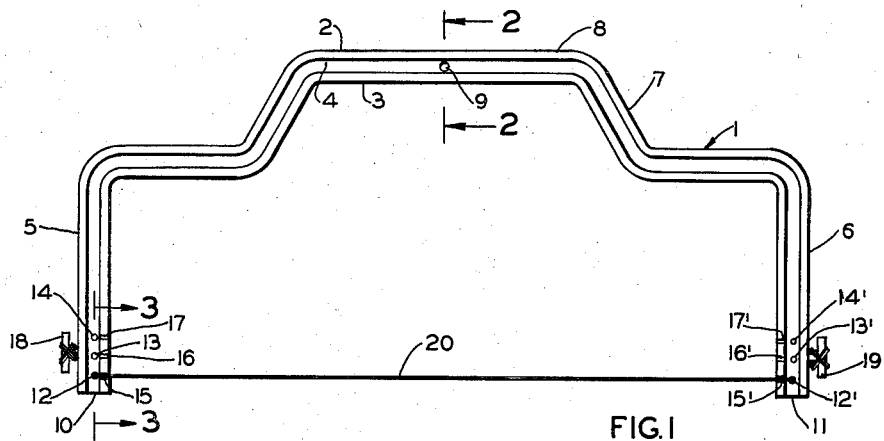
Figure 2:
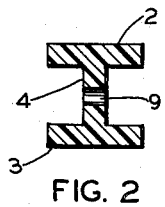
Figure 3:
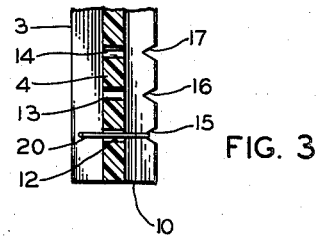

Referring now in more detail and by reference characters to the drawing which illustrates a practical embodiment of the present invention, A designates a cake-layer cutter comprising a generally U-shaped handle 1 preferably formed of a suitable molded plastic such as a phenolformaldehyde resin and also preferably of I-beam cross-sectional shape having flanges 2, 3, joined by a web 4. The handle 1, is, furthermore, provided with spaced parallel legs 5, 6, cross-connected at their upper ends by a bight 7 having a central hand-grip portion 8. Formed in the web 4 centrally of the hand-grip portion 8 is a hole 9 by which the handle 1 can be removably hung upon a nail or hook which is mounted on a wall (not shown).

Upwardly from the planar bottom surfaces 10, 11, of the legs 5, 6, the web 4 is provided with a plurality of pairs of indexing holes 12, 13, 14, 12', 13', 14', the vertical spacing of the holes 12, 13, 14, 12', 13', 14', in each leg 5, 6, preferably being one-quarter inch with the lowermost pair of holes 12, 12', being spaced one half inch from the bottom surfaces 10, 11. At one edge and also on the legs 5, 6, the flange 3 is formed with V-notches 15, 16, 17, 15', 16', 17'. which are aligned with the respective pairs of holes 12, 13, 14, 12', 13', 14', and integrally formed on the flange 2 in the region of the holes 12, 13, 14, 12', 13', 14', are cleats 18, 19 Wrapped at its ends around the cleats 18, 19, is a cutter strand 20 which is preferably of mercerized cotton thread and extends transversely of the legs 5, 6. The strand 20 is adapted to be inserted in any selected pair of holes 12, 13, 14, 12', 13', 14', and when tensioned will lie in the V-grooves corresponding to the holes through which the strand 20 extends.

Figure 4:
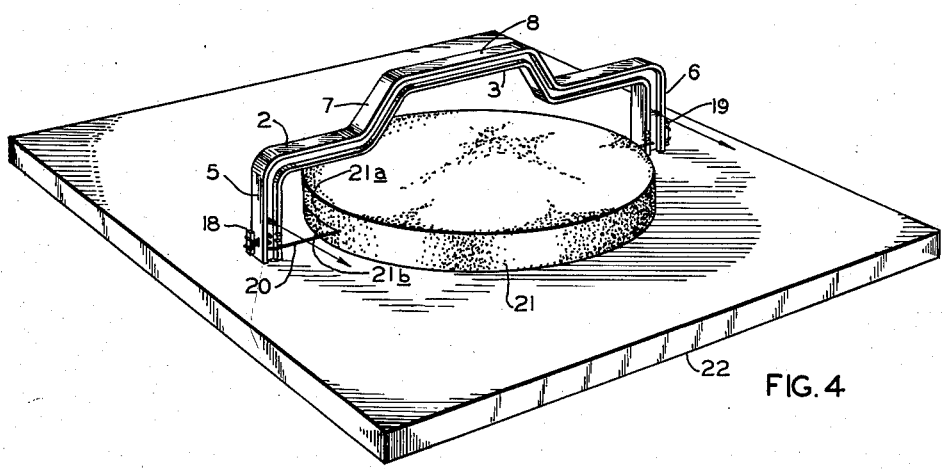
Fig. 4 is a perspective view showing the manner of using the cake cutter.
Figure 5:
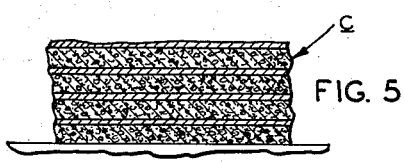
Fig. 5 is a vertical sectional view of a layer cake in which the layers have been cut by the cutter of the present invention.

In use, the layers 21 are baked in the usual manner and thereafter each layer 21 is removed from the cake pan and placed upon a tray 22. The cutter strand 20 is then wrapped around one of the cleats 18, 19, passed through a selected pair of holes 12, 13, 14, 12', 13', 14', and drawn up tautly whereupon the free end of the strand 20 is wrapped around the other cleat. It will be understood that the pair of holes selected will depend upon the thickness of the layer 21. For example, if the layer 21 has been baked in a two-inch cake pan, the cutting strand 20 will be inserted through the holes 12, 12', so that the strand 20 is spaced one inch upwardly from the bottom surfaces 10, 11. The handle 1 is then grasped and placed in a vertical position adjacent the layer 21 with the bottom surfaces 10, 11, resting flat on the tray 22 and the notches 15, 16, 17, 15', 16'. 17', presented toward the layer 21. Thereupon, the handle 1 is moved across the layer 21 in the direction of the arrows in Fig. 4 allowing the cutting strand 20 to split the layer 21 lengthwise in half and form two layers 21a, 21b. The remaining layers can be cut in the same manner and superimposed upon each other in any desired order to form the cake C shown in Fig. 5.

It has been found that since the bottom surfaces 10, 11, are relatively broad, the surfaces 10, 11, will remain flush against the tray 22 as the cutter strand 20 is drawn through the layer 21. Consequently, the handle 1 will not readily tip to an angle to the vertical and the cutter strand 20 will be held in a truly parallel position with respect to the tray 22. As a result, the layer 21 will be split along a planar path by the strand 20 without damage to the layer 21. Furthermore, if the strand 20 should become soiled or frayed, it is easily removed and replaced. It has also been discovered that wire does not operate satisfactorily when used as a cutter strand since there is some tendency for wire to tear the layer during the splitting operation. On the other hand, textile thread provides a clean cut without damage to the layer 21.

It should be understood that changes and modifications in the form, construction, arrangement, and combination of the several parts of the cake-layer cutters may be made and substituted for those herein shown and described without departing from the nature and principle of our invention.

Having thus described our invention, what we claim and desire to secure by Letters Patent is:

1. A cake-layer cutter comprising a handle having a pair of spaced legs provided with free ends, said legs terminated at their ends with flat planes, each plane being coplanar with the plane of the opposite leg for slidable engagement with a flat surface on which a cake is disposed, a fibrous cutter strand extending transversely between said legs, indexing means on said legs for locating said strand at any one of a plurality of positions spaced from said free ends and parallel to the common plane of said free ends whereby to cut the cake between the free ends of said legs and said cutter strand as the legs are slid across said flat surface, and cleats on the outwardly presented faces of said legs for securing said strand in such position.

2. A cake-layer cutter comprising a handle having a pair of spaced parallel legs provided with free ends, said legs terminated at their ends with flat planes, each plane being coplanar with the plane of the opposite leg for slidable engagement with a flat surface on which a cake is disposed, each of said legs being provided with a plurality of holes spaced inwardly of said free ends, the holes in each leg being spaced at varying distances from said free ends, the spacing between a hole in one leg and the free end of said leg being equal to the spacing between the corresponding hole and the free end of the other leg, whereby to define a line between said holes, said line being parallel to the common plane of the flat ends of said legs, said legs having notches formed therein adjacent said holes, a fibrous cutter strand extending transversely between said legs and adapted to be positioned in one hole and its associated notch on each leg, and cleats on the outwardly presented faces of said legs for securing the ends of said cutter strand.

3. A cake-layer cutter comprising a handle having a substantially horizontal bight portion and downwardly extending portions which are integrally connected at their outer ends to outwardly extending side arms, said side arms being, in turn, integrally connected at their outer ends with relatively long depending parallel vertical leg members, each of said vertical leg members integrally including an inner and outer vertical flange, said flanges being integrally held in spaced parallel relation by transverse webs, each web being provided with a plurality of vertically spaced holes, the inner flange of each leg being provided with a marginal notch horizontally aligned with each hole, the outer flange being provided on its outwardly presented face with a cleat, and a cutter strand extending tautly between said vertical legs and being threaded at its opposite ends through one of said notches and its associated hole, and being thence secured around the adjacent cleat so as to be removably held in place thereby.

References Cited in the file of this patent

UNITED STATES PATENTS

| | | |
|---|---|---|
| 956,072 | Glaus | Apr. 26, 1910 |
| 2,023,706 | Smith | Dec. 10, 1935 |
| 2,274,193 | Evans | Feb. 24, 1942 |
| 2,450,502 | Culdice | Oct. 5, 1948 |
| 2,504,756 | Tenborg | Apr. 18, 1950 |
| 2,533,682 | Nelson | Dec. 12, 1950 |
| 2,611,952 | Chambers | Sept. 30, 1952 |
| 2,759,261 | Setecka | Aug. 21, 1956 |

FOREIGN PATENTS

| | | |
|---|---|---|
| 1,034,341 | France | Apr. 8, 1953 |